United States Patent
Tinsley et al.

(10) Patent No.: US 6,369,621 B1
(45) Date of Patent: Apr. 9, 2002

(54) VOLTAGE/CURRENT MODE TIA/EIA-644 COMPLIANT FAST LVDS DRIVER WITH OUTPUT CURRENT LIMIT

(75) Inventors: Steven J. Tinsley, Garland; Fernando D. Carvajal, Fairview, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/820,581

(22) Filed: Mar. 29, 2001

(51) Int. Cl.[7] .............................. H03B 1/00; H03K 3/00
(52) U.S. Cl. ......................................... 327/108; 327/87
(58) Field of Search ............................... 327/52–55, 77, 327/87, 89, 90, 108, 432, 492, 561; 326/82, 83, 89

(56) References Cited

U.S. PATENT DOCUMENTS

| | | | | |
|---|---|---|---|---|
| 5,617,046 A | * | 4/1997 | Palara et al. ................ | 327/110 |
| 5,793,239 A | * | 8/1998 | Kovacs et al. ............... | 327/262 |
| 5,796,276 A | * | 8/1998 | Phillips et al. ............... | 327/108 |
| 6,111,431 A | * | 8/2000 | Estrada ......................... | 326/83 |
| 6,201,421 B1 | * | 3/2001 | Takeuchi et al. ............. | 327/110 |
| 6,252,440 B1 | * | 6/2001 | Sushihara et al. ........... | 327/110 |
| 6,313,662 B1 | * | 11/2001 | Ide ................................. | 326/83 |

* cited by examiner

*Primary Examiner*—My-Trang Nu Ton
(74) *Attorney, Agent, or Firm*—W. Daniel Swayze, Jr.; W. James Brady; Frederick J. Telecky, Jr.

(57) ABSTRACT

A fast voltage differential signaling (LVDS) transceiver (50) having high repeater speeds up to 1.36 GBps, and also meeting the TIA/EIA-644 standard short-to-ground requirements. A mixed voltage-current mode differential driver has a respective control signal (A3) driving each of the drive transistors (Q3). The control signal (A3) is controlled by a transistor (M1) being a function of current through the respective drive transistor (Q3). A current mirror (Q4, Q5, Q6) is used to mirror current conducting through a transistor (Q4) in parallel with the drive transistor (Q3), which mirror current is compared against a current reference (Iref).

28 Claims, 4 Drawing Sheets

FIG. 1
(CONVENTIONAL)
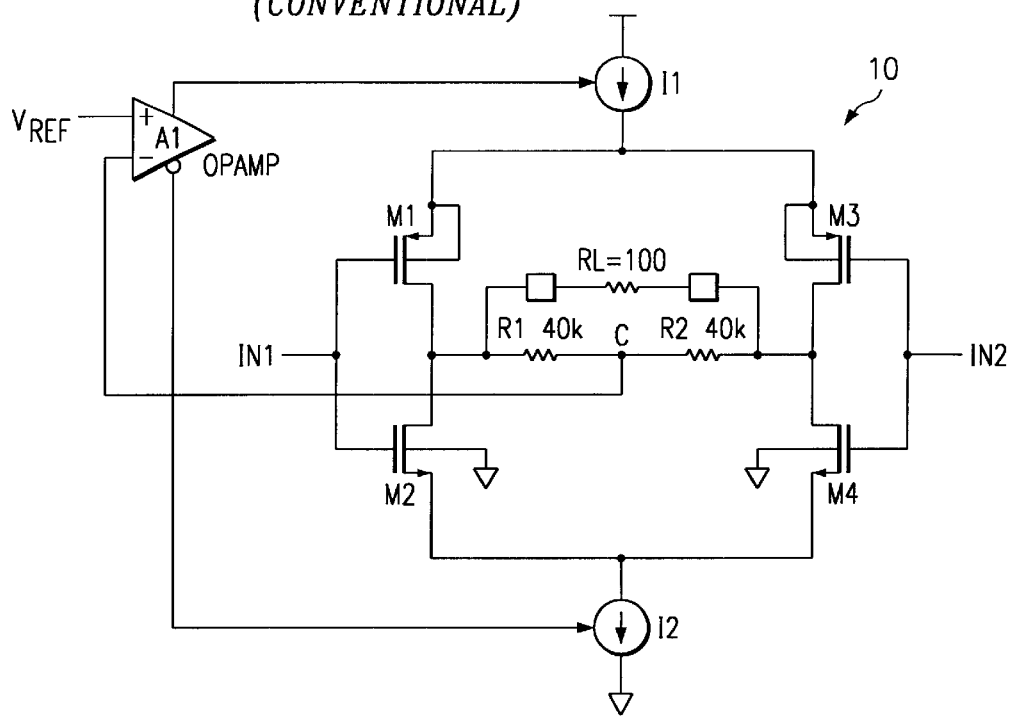
FIG. 2
(CONVENTIONAL)
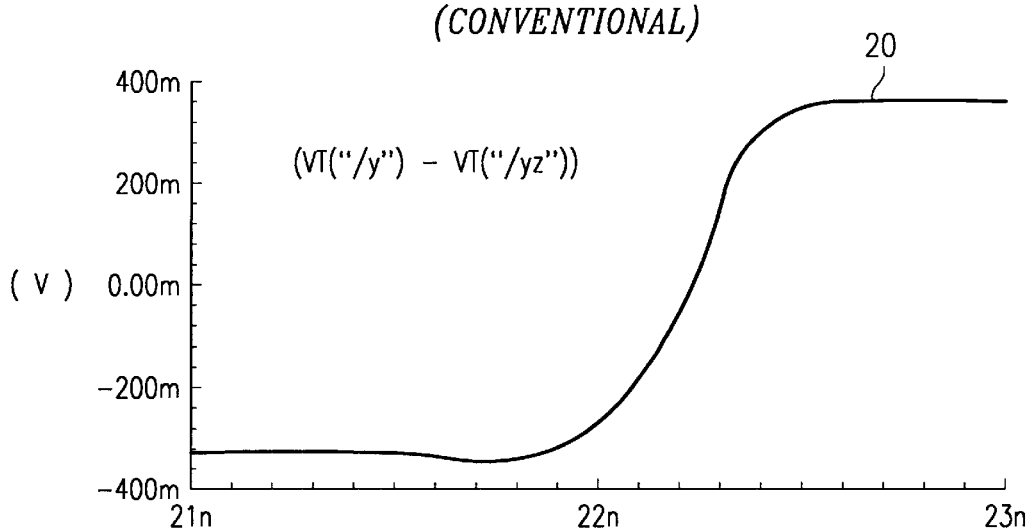

VOLTAGE/CURRENT MODE TIA/EIA-644 COMPLIANT FAST LVDS DRIVER WITH OUTPUT CURRENT LIMIT

FIELD OF THE INVENTION

The present invention is generally related to differential driver circuits, and more particularly to fast LVDS drivers including those having stringent short-to-ground requirements.

BACKGROUND OF THE INVENTION

The next generation low voltage differential signaling (LVDS) transceiver parts being developed are the high speed LVDS repeater type, such as PECL/ECL to LVDS converter type. These transceivers are configured to receive a differential input signal and drive a TIA/EIA-644 compliant LVDS signal. There are several high speed LVDS repeater parts currently on the market, but none which is fully TIA/EIA-644 compliant. The chief technical problem with a high speed repeater (up to 1.36 GBps) is to reduce the rise/fall times into the range in which the maximum speed requirement can be adequately met. Existing TIA/EIA-644 compliant drivers are typically current mode differential drivers which are limited by their architecture to around 600 MBps. Existing Gigibit speed repeaters are generally not TIA/EIA-644 compliant.

Moreover, the high speed repeaters currently on the market do not conform to the short-to-ground requirements called out in the TLA/EIA-644 specification, and therefore are not truly LVDS compatible.

There is desired a Gigibit fast LVDS driver which limits output current for shorts-to-ground.

SUMMARY OF THE INVENTION

The present invention achieves technical advantage as a Gigabit fast LVDS transceiver (50) which also limits output current for shorts to ground. The circuit acts to both detect and limit the current in the voltage reference portion of the output. A methodology is used to detect and limit the current which provides a significant improvement in performance over the prior art. The fast LVDS transceiver is particularly adapted to be fully TIA/EIA-644 compliant.

BRIEF DESCRIPTION OF THE DRAWINGS

FIG. 1 is a schematic of an Existing Current Mode LVDS Driver;

FIG. 2 is a typical differential output waveform for the existing LVDS Driver of FIG. 1;

DETAILED DESCRIPTION OF THE PREFERRED EMBODIMENT

TIA/EIA-644 LVDS drive levels are defined as a differential voltage signal with a nominal magnitude of 350 mV and 1.2V common mode offset across a differential resistive load of 100 ohms. The circuit 10 of FIG. 1 achieves differential levels across the load resistance $R_L$ by switching the source currents of I1 and I2 through the MOS switches M1–M4. The in1 and in2 differential signals are data input to the driver 10, and are driven inverted from each other. The MOS switches M1–M4 are operated like an H bridge, steering the I1/I2 current through load RL in the positive direction on one phase of the data, and in the negative direction on the other data phase.

A common mode control system is provided by the two (2) 40 kOhm resistors R1 and R2 and the differential opamp A1. The common mode is detected internally at the junction C of the 40 kOhm resistors, and is fed to the negative (inverting) input of the opamp A1. The opamp output is used to control the magnitude of the I1 and I2 current sources differentially, which controls the common mode of the output based on the reference voltage Vref, which is generally the bandgap, voltage (approximately 1.2 v).

This circuit 10 is fully compliant to the TLA/EIA-644 specifications, including short-to-ground current. However, short-to-ground current in this design is limited by the fact that the output current to Vcc and to Ground is current limited by source currents I1 and I2. The rise and fall times of the circuit 10 illustrated in FIG. 1 is limited to about 400 pS in current BiCmos technologies. BiCmos or bipolar processes are used for LVDS parts since the high speed bipolar devices are needed for the receiver inputs.

A typical differential output waveform 20 for this circuit 10 is shown in FIG. 1, showing a rise time of about 400 pS.

Figure 3:
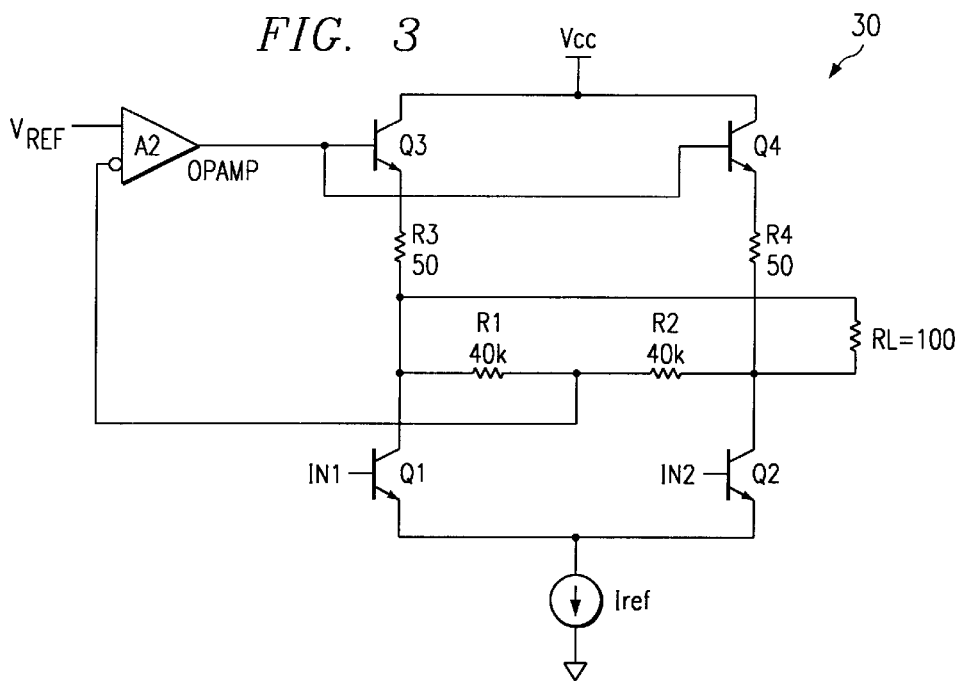
FIG. 3 is a schematic of an existing Fast LVDS Driver Topology.

The circuit 30 in FIG. 3 depicts one current topology used for Fast LVDS drivers. While the circuit 10 of FIG. 1 is a fully current mode driver, the circuit 30 of FIG. 3 is a mixed voltage and current mode driver. The bipolar transistors Q1 and Q2 are used to switch between clock phases, and are driven by a low signal voltage pre-drive stage which insures that they do not saturate. The output levels are set by the emitter follower transistors Q3 and Q4, and the current source Iref. Current source Iref provides the current reference, and voltage Vref provides a voltage reference for the common mode.

The common mode control used in circuit 30 of FIG. 3 is similar to that used in the circuit 10 of FIG. 1. Common mode feedback from the junction C of the two 40 kOhm resistors R1 and R2 is fed back to the inverting side of the opamp A2, and controls the base voltage at transistors Q3 and Q4. Current source Ifref is set to the current required through the load $R_L$ plus whatever current is required to bias the inactive side of the circuit 30.

For example, when input in1 is high and input in2 is low, very little current flows in transistor Q2. Transistor Q4 provides current to the load resistor $R_L$, and current Iref is sized to provide enough current to pull the emitter of transistor Q3 down to the level needed to achieve the proper voltage at the collector of transistor Q1. Transistor Q1, therefore, sinks current equal to the current in the load resistor RL plus the current from transistor Q3. Since the transistor Q1 side pulls down farther than the transistor Q2 side, the emitter voltage of transistor Q3 is lower than the emitter voltage of transistor Q4. This means that transistor Q3 actually provides more current than transistor Q4, since the collector current is exponentially related to the base emitter voltage. The base inputs of Q1/Q2 must be driven at appropriate levels to prevent saturation, so the predrive circuit for the circuit 30 of FIG. 3 is more complex than the predrive for circuit 10 of FIG. 1.

The advantage of the fast LVDS circuit 30 is that since much faster bipolar transistors are used to provide switching, the circuit can achieve rise/fall times of less than 200 pS, providing a significant increase in performance over the MOS switched LVDS driver 10. Since transistors Q3 and Q4 act as voltage followers, the circuit 30 of FIG. 3 is not strictly a current mode driver, and is not current limited to the positive supply.

Figure 4:
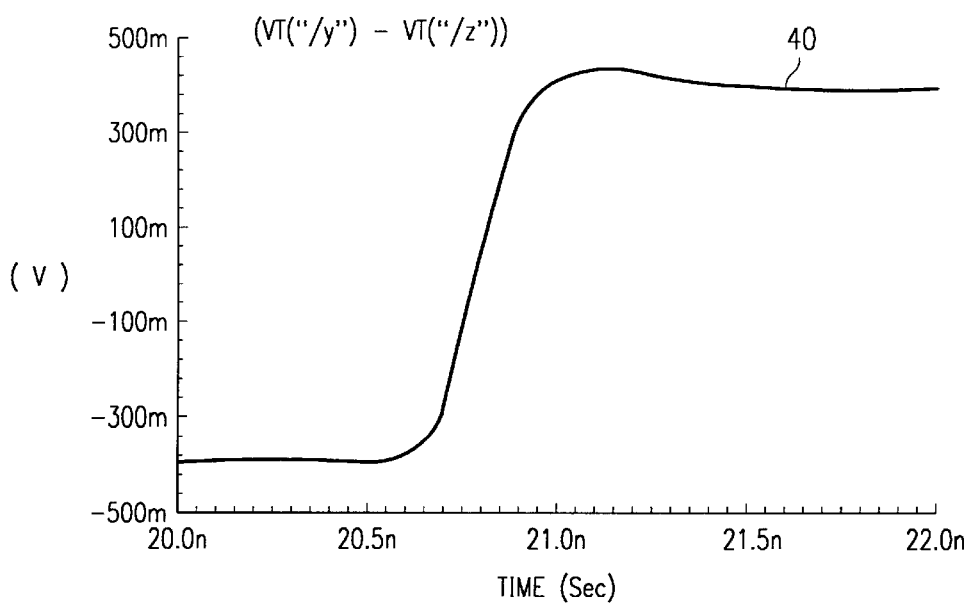
FIG. 4 is a typical differential output waveform for the fast LVDS Driver of FIG. 3.

FIG. 4 illustrates a typical differential output waveform 40 (compare with FIG. 2) for the fast LVDS driver of FIG. 3, showing a rise time of about 180 pS.

The problem with the circuit 30 of FIG. 3 is that a short-to-ground on either bus pin undesirably causes excessive output current. The TIA/EIA-644 specification calls for a maximum short-to-ground current of 24 mA. When either bus pin is shorted to ground, the common mode control circuit tries to maintain the reference voltage at the common mode point C. Since the base voltages of the control transistors Q3/Q4 are held constant and the emitter voltage is reduced, the base-emitter voltage is increased, which causes an exponential increase in the current provided by the control device on the shorted side according to the collector current relationship:

$$Ic = Is \cdot A \cdot e^{Vbe/V_T}$$

Figure 5:
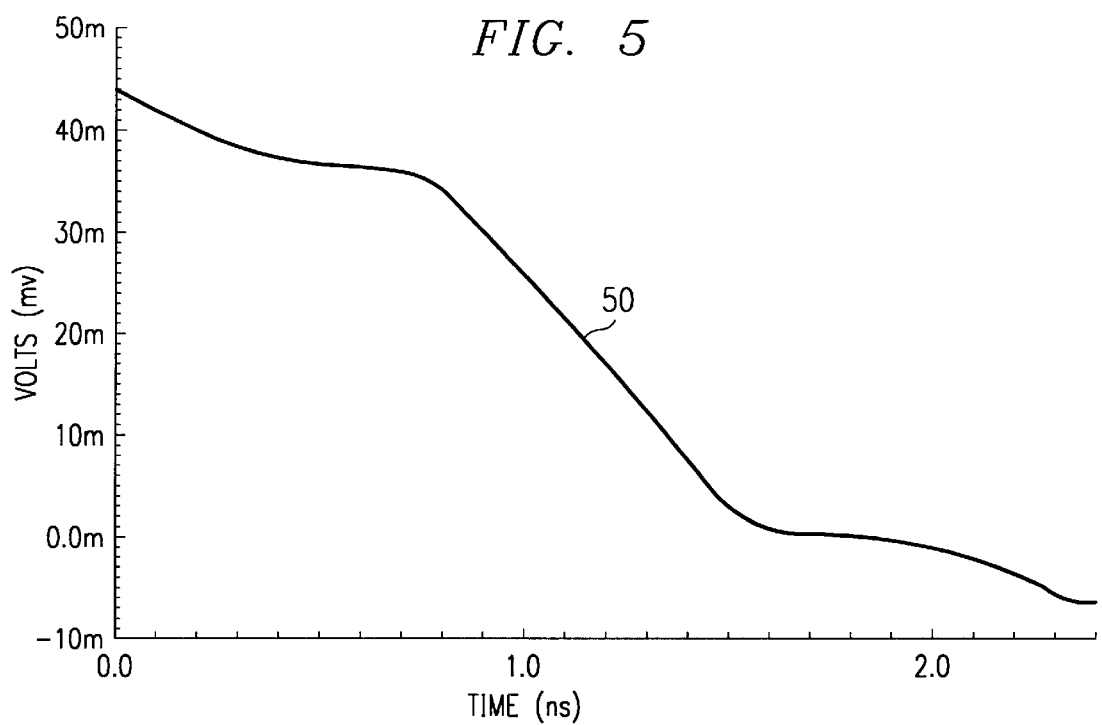
FIG. 5 is a graph of a simulated short circuit current condition for the circuit of FIG. 3.

This problem presents itself as an excessive short to ground current for the bus pins. Short to ground current can be as high as 50 mA in typical applications. The waveform 50 of FIG. 5 shows simulated results of a short to ground test for the circuit 30 of FIG. 3. The x axis is the voltage which the output is shorted to, and the y axis is the current into that short. As the voltage approaches zero, the short circuit current increases to about 40 mA.

A circuit is therefore needed to limit the current in fast LVDS drivers to prevent short to ground violations of the TIA/EIA-644 standard.

Figure 6:
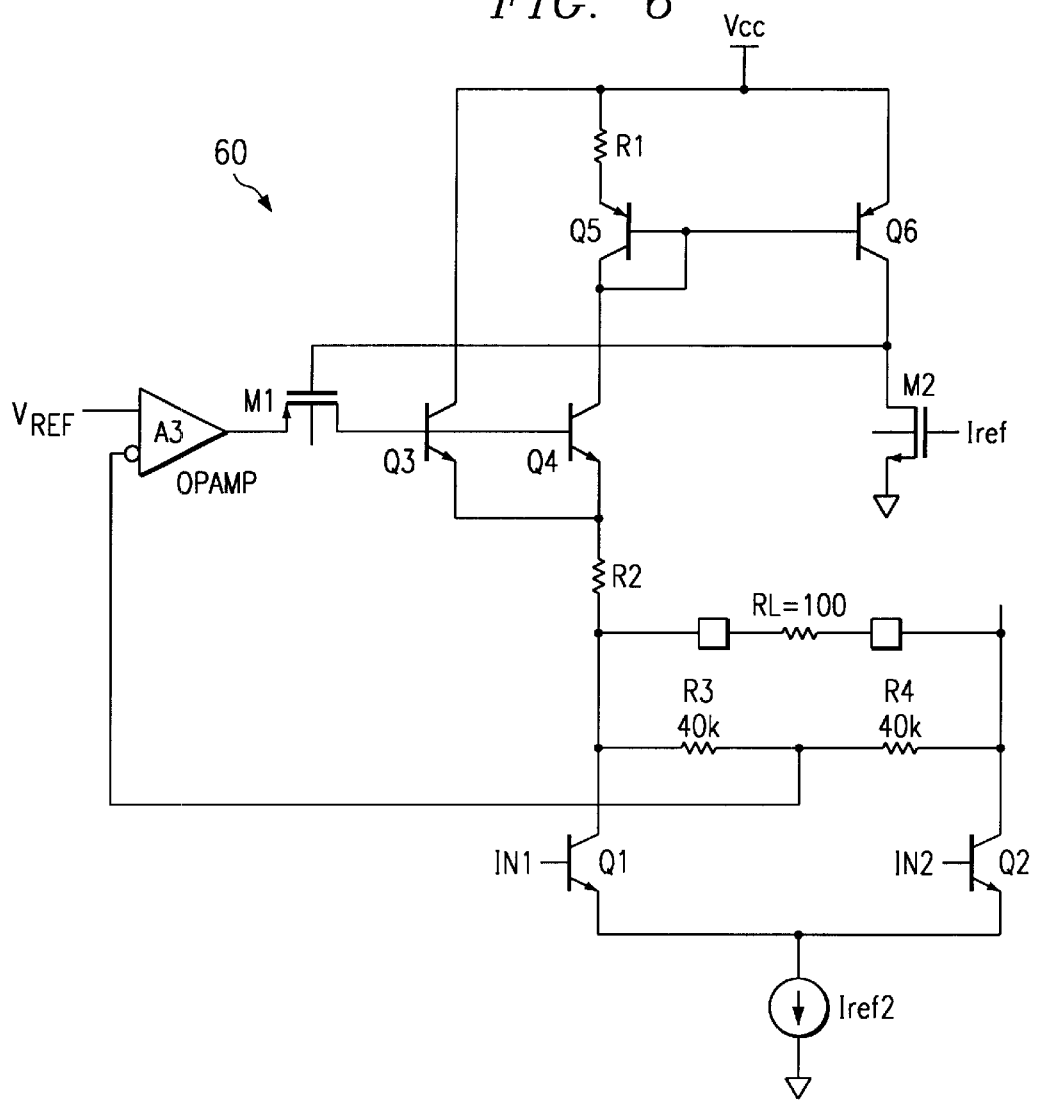
FIG. 6 is a schematic of a Fast LVDS Current Control Circuit according to the present invention.

The mixed voltage-current mode differential driver circuit 60 of FIG. 6 achieves technical advantages by limiting short circuit current that meets the TLA/EIA-644 requirement. For the purposes of clarity, only one side of the control circuit is shown being associated with transistors Q1 and Q3, with it being understood an identical control circuit is provided for the otherside including transistor Q2. The basic circuit 60 of FIG. 6 is similar to circuit 30 of FIG. 3, with transistor Q3 being the voltage control device, transistors Q1 and Q2 being the switching transistors receiving a differential signal input, and resistors R3/R4 and the opamp A3 comprising the common mode feedback circuit.

The basic operation of the current limiting circuit 60 is to detect the current in transistor Q3, compare it against a reference current, and use the M1 MOS transistor to limit the base drive to transistor Q3. To accomplish this, transistor Q4 is connected in parallel with transistor Q3 to detect the transistor Q3 current. Advantageously, since the base-emitter voltages of transistor Q3 and Q4 are the same, the collector current of transistor Q4 will be approximately equal to the collector current in transistor Q3, but times the known ratio of the emitter areas of the 2 transistors, thus providing a scaling factor. Advantageously, transistor Q4 can be made a fraction of the physical size of transistor Q3, so that the scaled mirrored current is not exceedingly high. Transistor Q5 is a PNP device that mirrors the detected current from transistor Q4 to transistor Q6, and the MOS device M2 is used to provide a reference current to compare with the mirror current through transistor Q6.

When the mirrored current in transistor Q6 is less than the known reference current in transistor M2, the gate control of transistor M1 is responsively pulled down, and base current flows freely from the feedback opamp A3 to drive transistor Q3.

When the mirror current in transistor Q6 approaches the reference current in transistor M2, the gate voltage of control transistor M1 responsively begins to pull up, which responsively starts to limit the collector current in transistor Q3. Since the collector current is also responsively limited in sensing transistor Q4, and this sensing current is mirrored to mirror transistor Q6, the feedback circuit advantageously provides a "soft" cutoff for the current.

In other words, as the current in drive or reference transistor Q3 approaches the predetermined limit set by the reference current Iref, the collector current in transistor Q3 is advantageously limited gradually, rather than cutting off all at once. The resistor R1 in the mirror circuit provides an adjustment to the current limit by degrading the performance of transistor Q5. For a given current in transistors Q3 and Q4, a greater resistance R1 provides a greater voltage drop from the positive supply rail to the base node of Q5/Q6. Since the base voltage is reduced, the current in transistor Q6 is increased, providing a higher voltage at the gate of control transistor M1. Since this higher voltage tends to turn M1 off, the net advantageous effect is a reduction in the collector current which the circuit is limited to. Advantageously, in this case, it is appreciated that the short circuit current has been reduced to 20 mA, which meets the TIA/EIA-644 requirement of no more than 24 mA.

Figure 7:
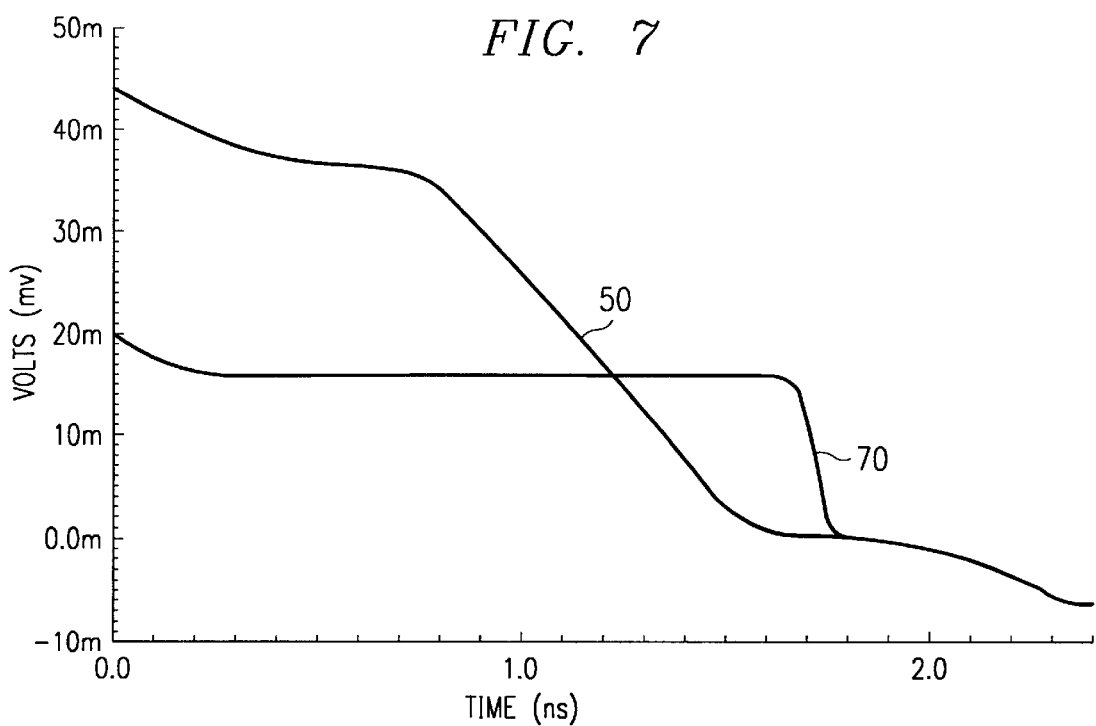
FIG. 7 is a simulated short circuit current for the improved fast LVDS driver of FIG. 6 compared to that of FIG. 5.

FIG. 7 shows the simulated short circuit current at 70 for the circuit 60 of FIG. 6, where the x axis is the voltage which the output is shorted to, and the y axis is the current into that short.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A driver circuit, comprising:
   a mixed voltage-current mode differential driver comprising a first pair of transistors adapted to be driven by a differential signal and a second pair of transistors;
   a common mode feedback coupled to the mixed voltage-current mode differential driver and providing a feedback signal;
   an amplifier responsive to the feedback signal and providing a control signal to a first transistor of the second pair of transistors; and
   a control circuit including a control device adjustably controlling the control signal to the first transistor.

2. The driver circuit as specified in claim 1 wherein the control device adjusts the control signal as a function of current conducted through at least one transistor of the second set of transistors.

3. The driver circuit as specified in claim 1 wherein current conducted through the first transistor is limited to a first predetermined level by the control device.

4. The driver circuit as specified in claim 3 wherein the current through the first transistor during a short circuit is at or below the first predetermined level.

5. The driver circuit as specified in claim 4 wherein the first predetermined level is compliant with the TIA/EIA-644 standard.

6. The driver circuit as specified in claim 1 wherein the control circuit includes a current mirror.

7. The driver circuit as specified in claim 6 wherein the current mirror mirrors current through a portion of the second pair of transistors.

8. The driver circuit as specified in claim 7 wherein the control circuit further includes a current reference coupled to the current mirror, wherein the control device is controlled as a function of the current reference relative to current in the current mirror.

9. The driver circuit as specified in claim 6 wherein the current mirror includes a resistor.

10. The driver circuit as specified in claim 9 wherein the control device controls the control signal as a function of the resistor value.

11. The driver circuit as specified in claim 1 wherein the control device does not adjust the control signal when current through a portion of the second pair of transistors is below a first predetermined level.

12. The driver circuit as specified in claim 11 wherein the control device begins to adjust the control signal when the current through a portion of the second pair of transistors exceeds the first predetermined level.

13. The driver circuit as specified in claim 12 wherein the control device limits the control signal when the current through a portion of the second pair of transistors reaches a second predetermined level.

14. The driver circuit as specified in claim 1 wherein the control device comprises a transistor.

15. The driver circuit as specified in claim 1 wherein the control circuit includes a sensing transistor coupled in parallel with one transistor of the second pair of transistors.

16. The driver circuit as specified in claim 15 wherein the sensing transistor is only a fraction in size of the associated parallel transistor of the second pair of transistors.

17. A method of limiting current in a mixed voltage-current mode differential driver having a first and second pair of transistors, the first pair of transistors coupled to be driven by a differential signal, comprising the steps of:
   a) adjusting a control signal driving at least one of the second pair of transistors;
   b) using a transistor to adjust the control signal driving one of the second pair of transistors;
   wherein the differential driver has a common mode feedback providing a feedback signal; comprising the step of the control signal being a function of the feedback signal.

18. The method as specified in claim 17 further comprising the step of adjusting the control signal as a function of current conducting through a portion of the second pair of transistors.

19. The method as specified in claim 18 further comprising the step of using a current mirror to sense current conducting through the portion of the second pair of transistors.

20. The method as specified in claim 19 wherein the current mirror includes a transistor in parallel with one transistor of the second pair of transistors.

21. The method as specified in claim 19 further comprising the step of adjusting the control signal as a function a resistor comprising a portion of the current mirror.

22. The method as specified in claim 18 further comprising the step of adjusting the control signal as a function of the current conducting through the portion of the second pair of transistors in relation to a current reference.

23. The method as specified in claim 17 comprising the step of providing the feedback signal to an amplifier providing the control signal.

24. The method as specified in claim 23 comprising the step of providing the feedback signal to an inverting input of an operational amplifier comprising the amplifier.

25. The method as specified in claim 24 comprising the step of providing a reference voltage to a non-inverting input of the operational amplifier.

26. The method as specified in claim 17 further comprising the step of the control signal adjusting current conducted through at least one of the second pair transistors in response to a short circuit condition.

27. The method as specified in claim 26 wherein the current conducted through the second pair of transistors meets the TIA/EIA-644 Standard.

28. The method as specified in claim 17 further comprising the step of the control circuit gradually reducing the current through the second pair of transistors during a short circuit condition.

* * * * *